United States Patent [19]

Hikawa

[11] Patent Number: 5,235,655
[45] Date of Patent: Aug. 10, 1993

[54] MARK PLACING AND CANCELING METHOD AND MARK RECOGNIZING DEVICE

[75] Inventor: Yuji Hikawa, Kanagawa, Japan

[73] Assignee: Fuji Xerox Co., Ltd., Tokyo, Japan

[21] Appl. No.: 901,177

[22] Filed: Jun. 19, 1992

[30] Foreign Application Priority Data

Jun. 20, 1991 [JP] Japan .................. 3-148433

[51] Int. Cl.[5] .......................... G06K 1/12; G06K 7/00
[52] U.S. Cl. ..................... 382/61; 235/454; 434/353
[58] Field of Search .............. 355/200, 202; 235/435, 235/454, 456, 494; 382/1, 11, 24, 61; 434/353, 355, 358, 363

[56] References Cited

U.S. PATENT DOCUMENTS

| | | | |
|---|---|---|---|
| 3,086,300 | 4/1963 | Rugland et al. | 434/353 |
| 3,558,859 | 1/1971 | Dilsner et al. | 235/454 X |
| 4,153,895 | 5/1979 | Weisbrod et al. | 235/456 X |
| 4,248,528 | 2/1981 | Sahay | 355/308 |

FOREIGN PATENT DOCUMENTS

| | | |
|---|---|---|
| 51-48333 | 4/1976 | Japan . |
| 51-144127 | 12/1976 | Japan . |
| 2-8171 | 1/1990 | Japan . |
| 2-178678 | 7/1990 | Japan . |

Primary Examiner—Joan H. Pendegrass
Attorney, Agent, or Firm—Finnegan, Henderson, Farabow, Garrett & Dunner

[57] ABSTRACT

A mark placing and canceling method, operating with a mark sheet provided with mark columns formed of closed areas demarcated with boundary lines, for entering a mark indicating a set-up of a control job in one of the mark columns, reading the mark sheet with a two-dimensional image reading device, and canceling the mark entered in the mark column on the mark sheet as recognized by means of a mark recognizing device. The mark placing and canceling method includes the steps of (a) entering a line forming a crossing point with the boundary line, as a mark for setting up a control job; and (b) entering a line forming new crossing points with the already entered line and with the boundary line, as a mark for canceling the set-up of the control job, in case the already entered mark is to be canceled.

12 Claims, 10 Drawing Sheets

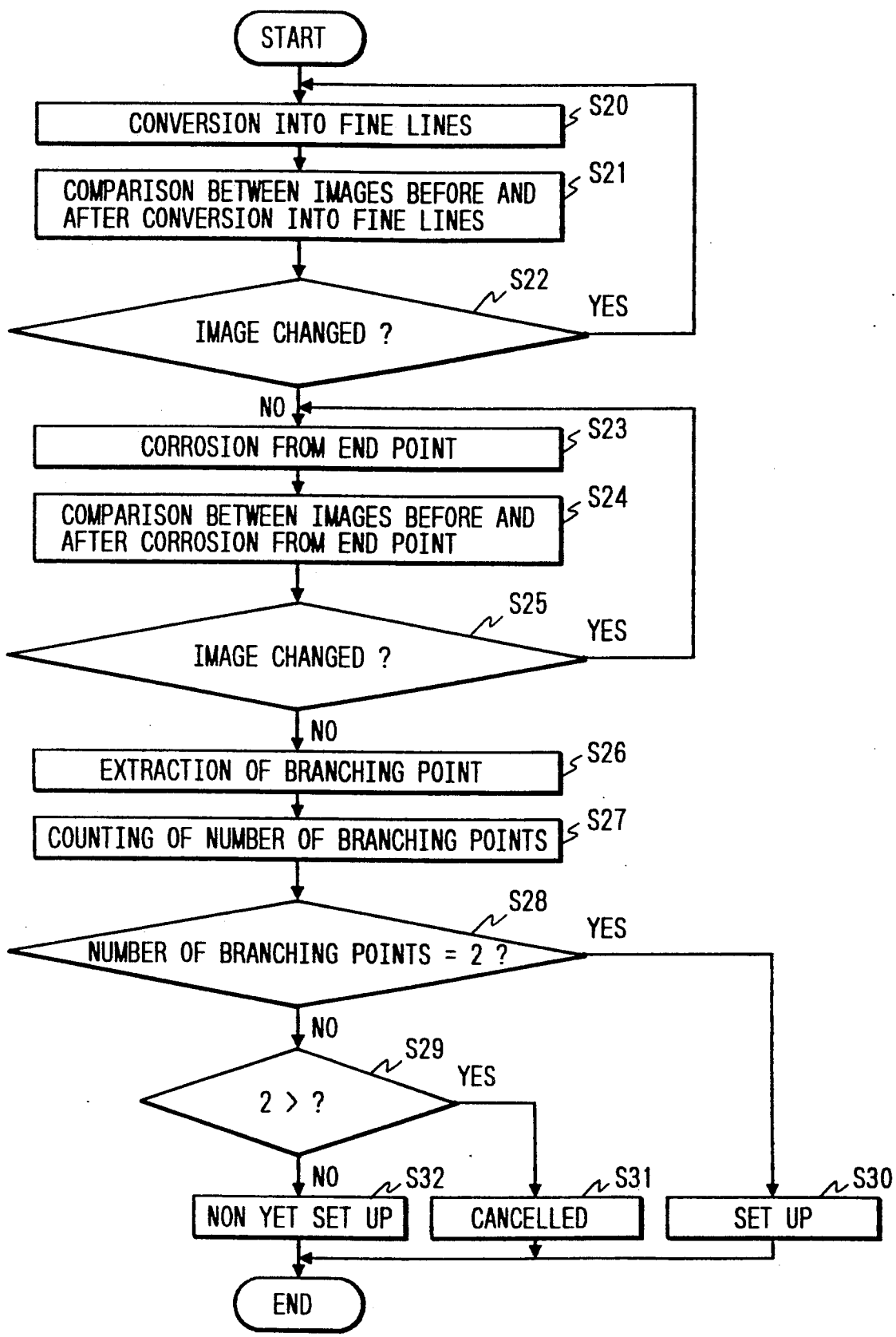

☐ WHITE PIXEL
■ BLACK PIXEL
▨ NOTED PIXEL

MARK PLACING AND CANCELING METHOD AND MARK RECOGNIZING DEVICE

BACKGROUND OF THE INVENTION

The present invention relates to a method of placing a mark for setting up a control job for controlling the operation of a copying machine or the like in a mark column on a job control sheet and canceling such a mark thus placed, and the present invention relates also to a mark recognizing device which recognizes the set-up and cancellation of a mark for a control job.

It has hitherto been known to those persons skilled in the art that there is an available technique which reflects a consideration for enabling the operator to finish a series of copying operations, without constantly attending on the copying machine or the like, by placing marks on mark columns on a mark sheet to indicate such control job items as the required number of copies, the desired image density, and the desired magnification or reduction of the images which the operator wants to have an image processing system like as a copying machine or a facsimile machine to perform, having a mark recognizing device recognize the marks placed on the mark sheet to identify the required control operations as indicated thereon, and then causing a copying machine or the like to perform the copying operations as required.

U.S. Pat. No. 4,248,528, which is cited here as an example for this type of equipment discloses a technique which is applied by the steps of an operator placing marks with a pencil as appropriate in the selected ones of a plural number of mark columns set in correspondence with various control jobs as printed on a mark sheet, thus preparing a job control sheet for the job to be executed, and setting such a job control sheet, together with a bundle of original documents, on an automatic document feeding device, and causing an optical scanner to read the particulars of the marks indicated on the job control sheet as it comes transported by the automatic document feeding device, and thus causing the copying machine to perform the control operations corresponding to the control jobs respectively indicated in the mark columns on the job control sheet. A similar technique is disclosed in Japanese Patent Unexamined Publication No. Hei. 2-8171, which discloses a method comprising the steps of forming many square-shaped mark columns on a programming sheet and setting up control jobs by placing marks with a pencil in the selected mark columns on the sheet.

In the meantime, a method of canceling a control job once set up with a mark entered in a mark column on a job control sheet is disclosed in Japanese Patent Unexamined Publication No. Sho. 51-144127, which discloses a technique consisting in pasting a white color piece of paper in a lozenge shape or a rectangle shape over a mark column on a job control sheet with a mark once entered.

Also, Japanese Patent Unexamined Publication No. Hei. 2-178678, discloses a technique for preparing a job control sheet, with bar codes printed by means of a printer in accordance with the result of a selection made of a control program out of control programs which are put on display on a screen of a Cathode Ray Tube (CRT) unit and indicate the operations which the operator desires to have a copying machine or the like perform.

Additionally, the color of the marking positions or the like on a mark sheet to be used as a job control sheet should be differentiated from the color of the writing tool, such as a pencil in a black color, and a mark sheet printed in a special ink or the like is used.

According to mark placing methods like those which are respectively described in U.S. Pat. No. 4,248,528 and Japanese Patent Unexamined Publication No. Hei. 2-8171, the method to be employed for canceling any control job for which a mark has been placed by mistake by the operator is to erase the trace of a mark entered with a pencil in a mark column by canceling it with a rubber eraser or the like. Thus, a trace of such a correction tends to remain on the mark column on the job control sheet, and, to make the matters worse, the rubber eraser tends to leave rubber dust on the paper, which causes the problem that the mark recognizing device gains a mistaken recognition that the control job has not been canceled.

The mark placing and canceling method according to the invention described in Japanese Patent Unexamined Publication No. Sho. 51-144127, which overcomes this disadvantage, still leaves the problem that the correcting job is troublesome because the method consists in pasting a piece of paper on a mark column in which a mistaken entry has been made.

On the other hand, the mark placing and canceling method according to Japanese Patent Unexamined Publication No. Hei. 2-178678 permits an easy and ready correction of a control program in the course of the preparation of a control program in conversation with the CRT display unit, but still presents the problem that it does not permit any simple and easy correction of an error in case an error is found in a control program after it is thus prepared and printed in the form of a job control sheet because a correction in such a case requires that the control program should be made once again in conversation with the CRT display unit.

Moreover, a job control sheet is provided with mark entry columns printed in a color different from the color of a pencil or the like which the user employs in placing such a mark, the job control sheet presents a problem in that the sheet cannot be produced by printing it readily with a usual monochromatic printer and further that a job control sheet prepared in this manner will usually cause difficulty in an optical reaction of this part when such a job control sheet is read with an image scanner in a copying machine or the like. It follows from this that it is necessary to print the job control sheet separately, which causes the problem that such a procedure results in an increase in the cost.

SUMMARY OF THE INVENTION

The present invention has been made in view of the problems described above, and an object of the present invention is, therefore, to offer a mark placing and canceling method which is capable of ensuring ease and simplicity in placing a mark for setting a control job in a mark column on a job control sheet and also in canceling a mark entered by mistake.

Another object of the present invention is to offer a mark recognizing device which is capable of recognizing the marks entered in the mark columns on the job control sheet mentioned above.

Still another object of the present invention is to offer a mark recognizing device which is capable of restraining a decline in its recognizing accuracy by subjecting the job control sheet to a corrosive treatment for eliminating the noises which will otherwise occur because of particulate stains or the like which are caused at the time when the job control sheet is printed.

In order to attain the above objects, the present invention provides a mark placing and canceling method, operating with a mark sheet provided with mark columns formed of closed areas demarcated with boundary lines, for entering a mark indicating a set-up of a control job in one of the mark columns, reading the mark sheet with a two-dimensional image reading device, and canceling the mark entered in the mark column on the mark sheet as recognized by means of a mark recognizing device, the method including the steps of (a) entering a line forming a crossing point with the boundary line, as a mark for setting up a control job; and (b) entering a line forming new crossing points with the already entered line and with the boundary line, as a mark for canceling the set-up of the control job, in case the already entered mark is to be canceled.

BRIEF DESCRIPTION OF THE DRAWINGS

The manner by which the above objects and other objects, features and advantages of the present invention are attained will be fully evident from the following detailed description when it is considered in light of the drawings, wherein:

FIG. 3 (B) is a model chart illustrating a check circle containing a canceling mark entered therein;

FIG. 3 (C) is a model chart illustrating a check circle in which no mark is yet set up;

FIG. 9 is a flow chart for the algorithm used for a discrimination of a check mark;

FIG. 10 (B) is a model chart illustrating an image recorded after the transformation into fine lines has been executed;

FIG. 10 (C) is a model chart illustrating an image recorded after the execution of a corrosive treatment from an end point of the line;

FIG. 11 (B) is a chart illustrating a coefficient used for a filter in the corrosive treatment performed from the end point of the line;

FIG. 11 (C) is a chart illustrating a coefficient used for a filter in the extraction of a branching point;

FIG. 12 (B) is a model chart showing a canceling mark for use for canceling a control job setting mark;

FIG. 12 (C) is a model chart showing a check circle with no job control mark set therein;

FIG. 13 (B) is a model chart showing the state in which a canceling mark for canceling a control job setting mark is entered in a mark column; and FIG. 13 (C) is a model chart showing the state in which a canceling mark is entered in a different form of entry.

DETAILED DESCRIPTION OF THE PREFERRED EMBODIMENTS

Now, reference will be made in detail to the present invention on the basis of preferred embodiments as illustrated in the accompanying drawings, in which like reference marks designate like or corresponding parts throughout the several drawings.

In the description to follow, some embodiments of the present invention will be used as examples. It should be understood, however, that the present invention is not limited to these examples of its embodiment, but may be applied effectively to other forms of its embodiment to such an extent as will not deviate from the technical scope defined herein for the present invention.

Figure 1:
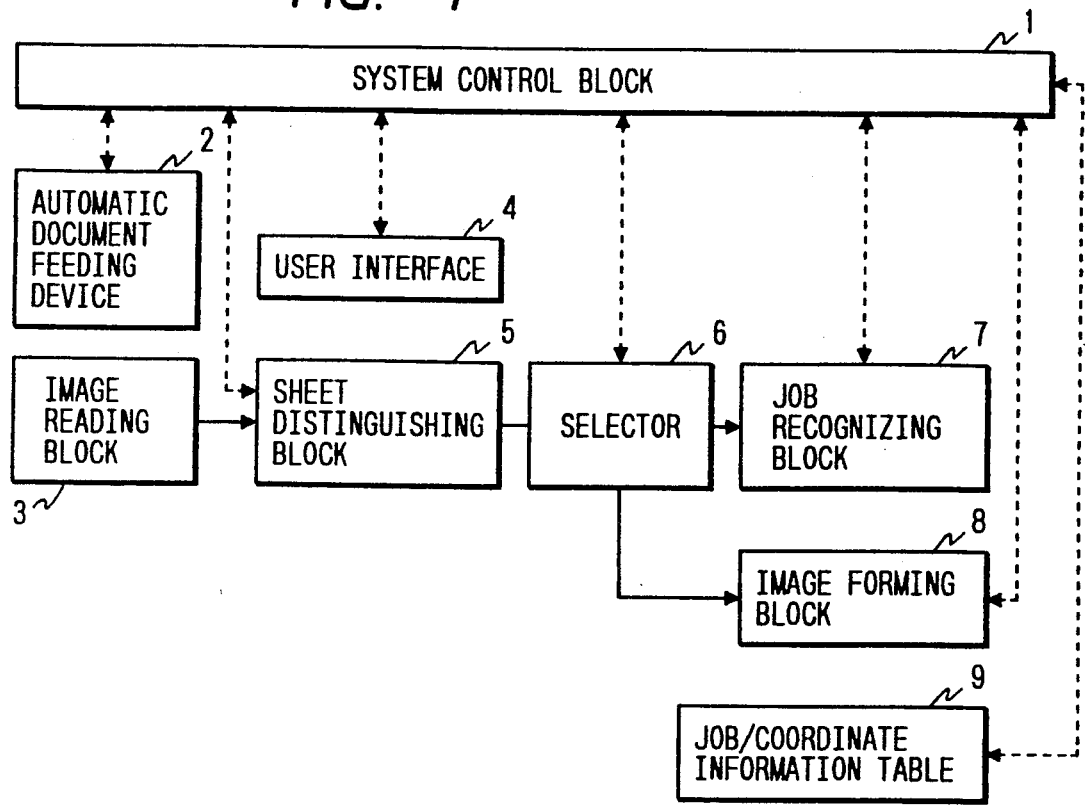
FIG. 1 is a functional block diagram illustrating an image processing equipment in an embodiment of the present invention.
Figure 2:
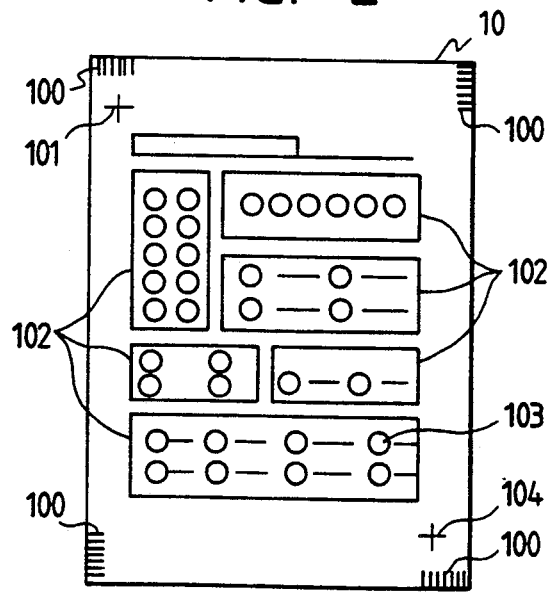
FIG. 2 is a front view illustrating a job control sheet.
Figure 3A:
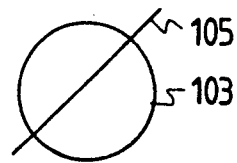
FIG. 3 (A) is a model chart illustrating a check circle containing a mark entered therein for setting up a control job.
Figure 3B:
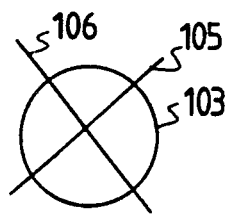
Figure 3C:
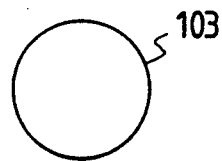
Figure 4:
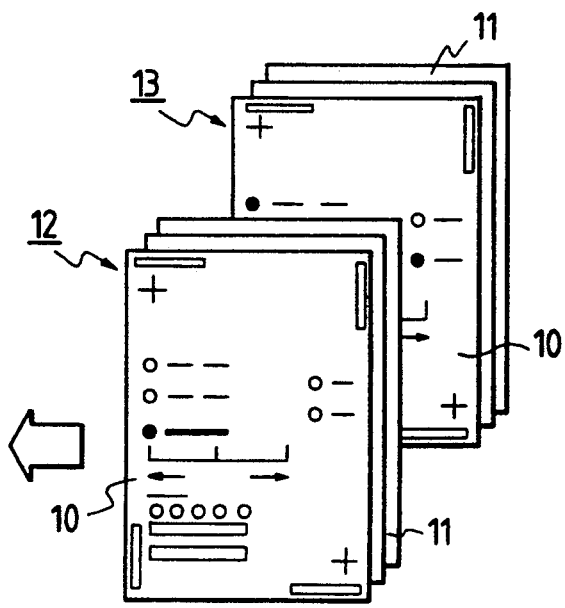
FIG. 4 is an explanatory chart illustrating an example of a job control sheet in use.
Figure 5:
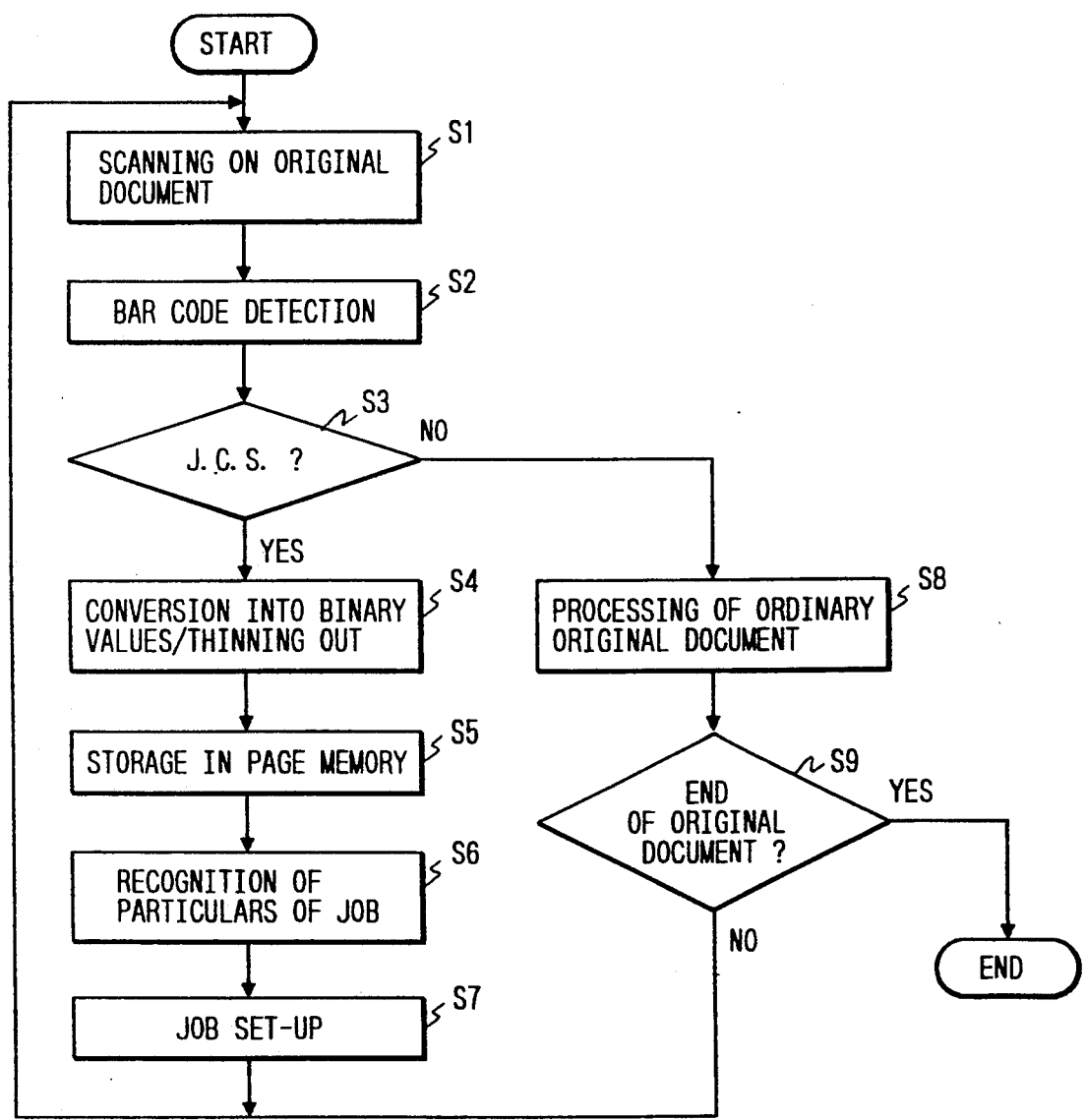
FIG. 5 is an approximate flow chart illustrating an algorithm used for the recognition of the job control sheet.
Figure 6:
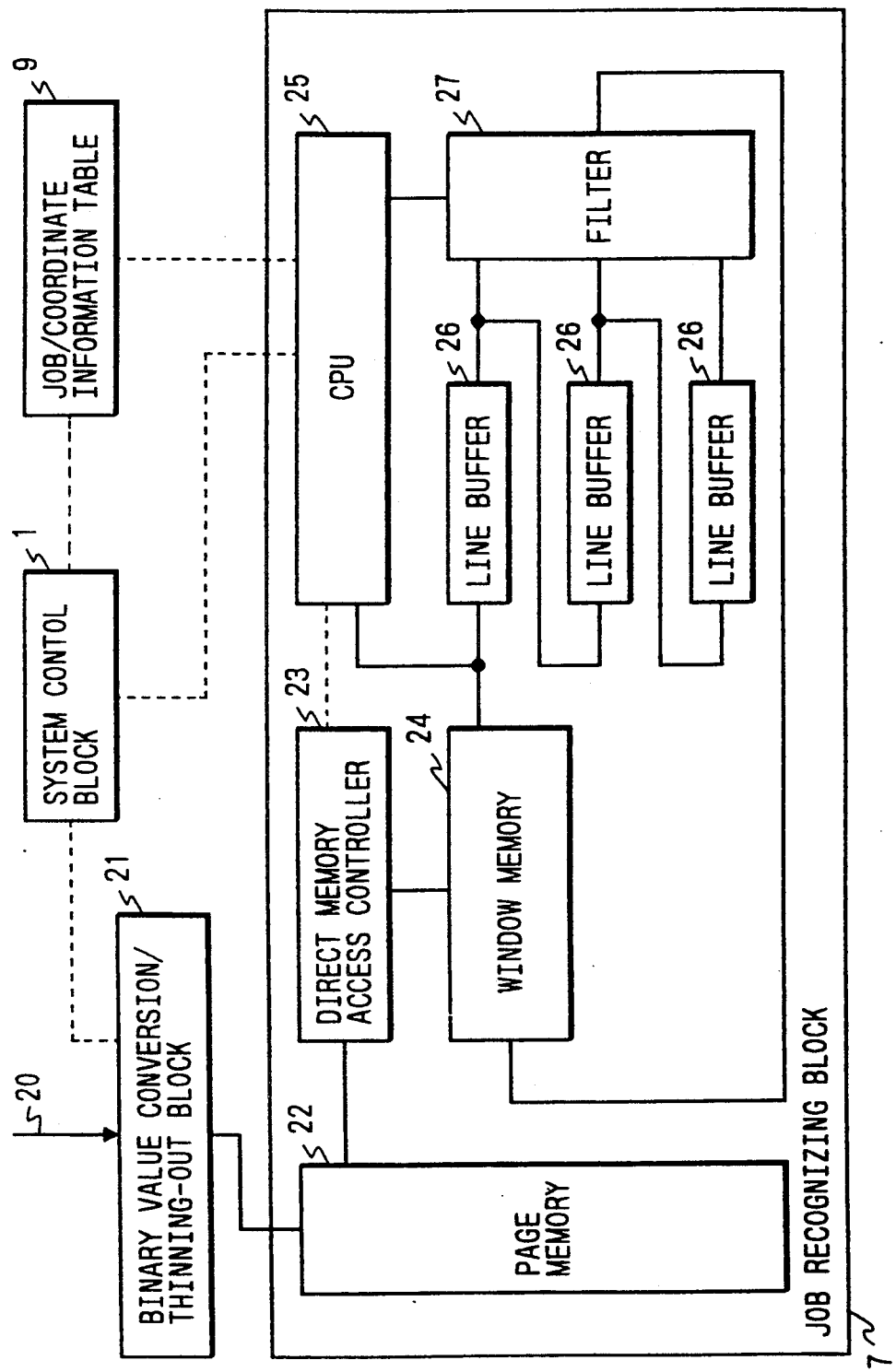
FIG. 6 is a block diagram illustrating the job recognizing block.
Figure 7:
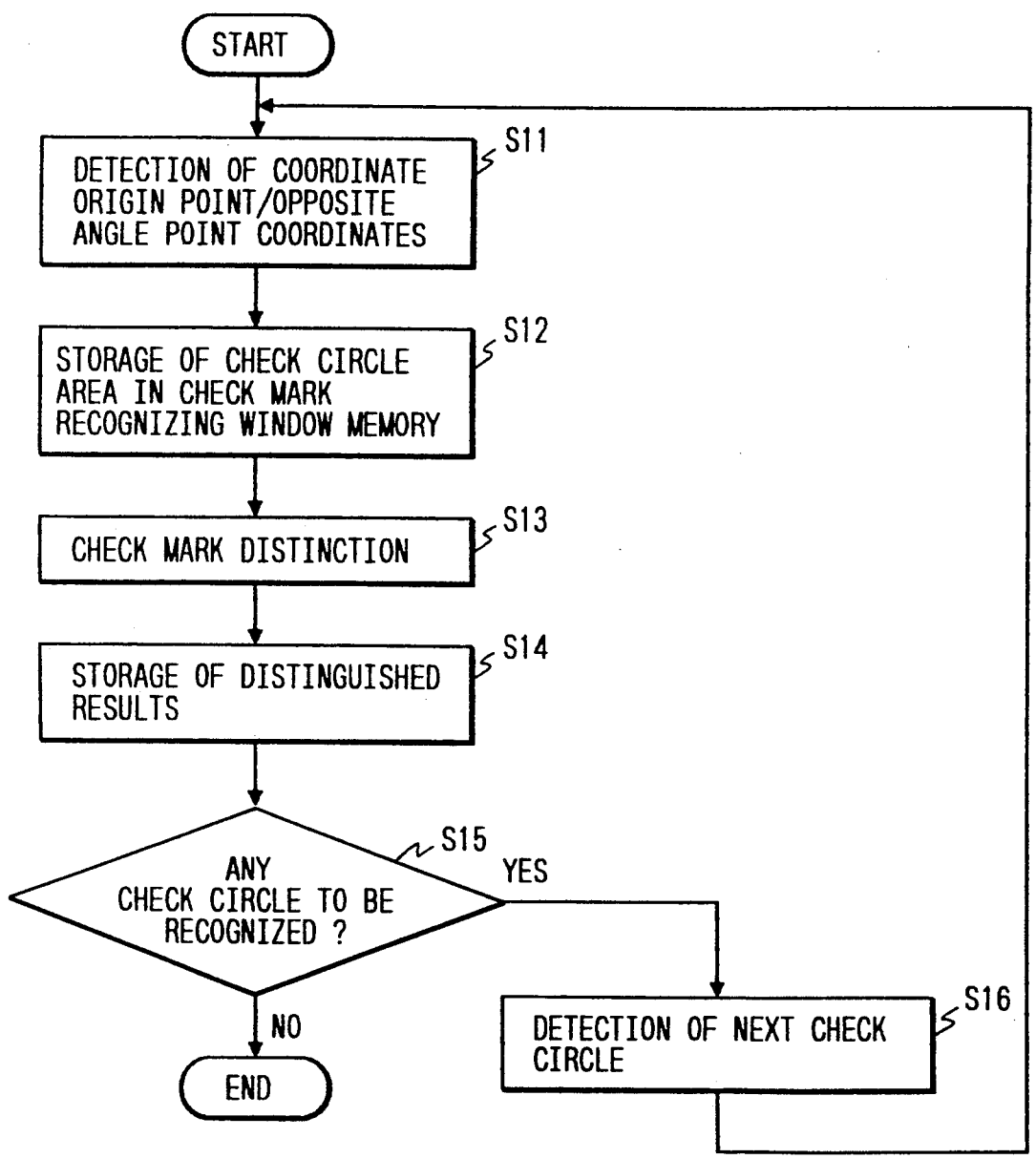
FIG. 7 is a flow chart for the algorithm used for the recognition of the particulars of a job.
Figure 8A:
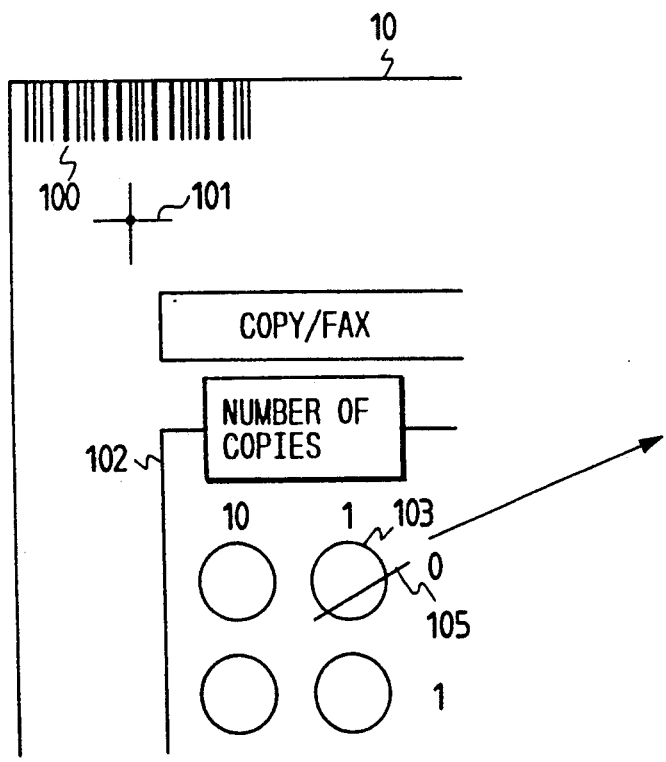
FIG. 8(a) and 8(b) is a model chart illustrating the relationship between a check circle and a check circle region.
Figure 8B:
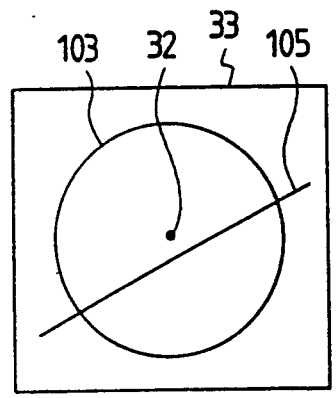

Now, the details of the present invention will be described with reference to the accompanying drawings. FIG. 1 is a functional block diagram illustrating an image processing equipment for processing an ordinary original document together with a job control sheet. FIG. 2 is a front view illustrating a job control sheet. FIG. 3 (A) is a model chart illustrating a check circle containing a mark entered therein for setting up a control job, FIG. 3 (B) is a model chart illustrating a check circle containing a canceling mark entered therein, and FIG. 3 (C) is a model chart illustrating a check circle in which no mark is yet set up. FIG. 4 is an explanatory chart illustrating an example of a job control sheet in use for a description of the state in which an ordinary original document and a job control sheet placed thereon are fed into an automatic document feeding device. FIG. 5 is an approximate flow chart illustrating the algorithm used for the recognition of the job control sheet. FIG. 6 is a block diagram illustrating the job recognizing block. FIG. 7 is a flow chart for the algorithm used for the recognition of the particulars of a job. FIG. 8 is a model chart showing the relationship between a check circle and a check circle region. FIG. 9 is a flow chart for the algorithm used for a discrimination of a check mark.

The following description of the preferred embodiments will be presented in the order of: (1) outline description of a mark recognizing device, (2) job control sheet, (3) overall operations of the mark recognizing device, (4) details of recognition of the particulars of a job, (5) details of the operation for distinguishing check marks, and (6) description of other embodiments.

(1) Outline Description of Mark Recognizing Device

FIG. 1 presents a functional block diagram for an image processing equipment which executes the operations for the processing of an ordinary original document together with a job control sheet placed thereon, and the solid lines in FIG. 1 represent the flow of an image signal while the broken lines in FIG. 1 represent the flows of control signals. First, an ordinary original document, or a job control sheet 10 placed on the ordinary original document (refer to FIGS. 2 and 4), which was fed by an automatic document feeding device 2, is transported to a two-dimensional image reading device, namely, an image reading block 3, which is provided with an image scanner capable of reading two-dimensional images, and the image read of the original document here is then transmitted to a sheet distinguishing block 5, and the image signal which has thus come transmitted is distinguished by the sheet distinguishing block 5 to determine whether the transmitted signal represents an ordinary original document or a job control sheet 10. In case the sheet distinguishing block 5 determines that the transmitted signal represents an ordinary original document, the sheet distinguishing block 5 communicates to a system control block 1 that the sheet thus distinguished is an ordinary original document. Upon reception of such a message, the system control block 1 transmits the read image signal to an image forming block 8, controlling a selector 6, and causes a copying machine or the like, which is not shown in the drawing, to perform image processing operations in accordance with a control job corresponding to instructions issued by a user interface 4 as operated by the operator.

Yet, in case it is determined by the sheet distinguishing block 5 that the sheet detected in the manner described above is a job control sheet 10, then the system control block 1 transmits the read image signal to a job recognizing block 7, controlling the selector 6, and then performs a recognition of the particulars of a job by discerning the particulars entered in the job designating column on the job control sheet 10, as it will be understood from a description made thereof later.

(2) Job Control Sheet

The job control sheet 10, which is shown in FIG. 2, is one which has been prepared with an ordinary monochromatic printer or the like, and the job control sheet 10 is provided with original document distinguishing marks 100, ..., which are indicated with bar codes at its four corners, a coordinate origin point 101 and an opposite angle point 104, which are indicated with a + mark in the proximity of the original document distinguishing marks 100 and 100 respectively positioned at its upper left side and at its lower right side, and a plurality of job designating columns (check mark columns) 102, each indicating circle-shaped check circles 103, ..., which indicate such control instruction signals to a copying machine or the like (which is not shown in FIG. 2) as the number of copies, the degree of density of the image, and a reduction or magnification of the image. Then, the original document distinguishing mark 100 is accorded with attributes of the job control sheet, such as a code indicating the type of the job control sheet. Also, a job/coordinate information table 9, which is shown in FIG. 1, contains pre-recorded information on such items as coordinate values for the coordinate origin point 101 and opposite angle point 104 on the job control sheet 10, the coordinate information on the check circles 103, ..., and information codes on the particulars of the jobs to be executed when the operator puts marks on the check circles 103, so that such information may be retrieved by the use of the attributes of the job control sheet as obtained from the original document distinguishing marks 100, ....

The operator selects the control jobs which he desires to cause a copying machine or the like to execute from the job designating columns 102, ..., and the method for such selections is to be put into its operation by selecting and marking the circular check circles 103, ..., which are indicated in the job designating columns 102, .... To explain this in more detail, the method of entering a mark is set up in such a manner, with the aim of reducing the burden otherwise placed on the operator, that a linear check mark 105 is to be entered with a pencil or the like in black color to cross a closed area in a circular shape in the check circle 103 as shown in FIG. 3 (A), in case a desired control job is to be set up, a linear canceling mark 106 is to be entered to cross the closed area in the check circle 103 and to cut across this check mark 105, in case this control job already set up is to be canceled as shown in FIG. 3 (B), and nothing is to be entered in the check circle 103 as shown in FIG. 3 (C) in case any control job is not yet to be set up. In other words, the method of setting up a job control is established in such a way that the system regards that the operator has selected and "set up" a control job for which he has entered the check mark 105 in case he has placed a mark with the check mark 105 in such a manner as to divide the check circle 103 into two parts while it regards that the operator has "canceled" the set-up of the control job in case he has entered the canceling mark 106 in such a manner as to form an X-mark by entering a line across the check mark 105.

Then, the determining conditions applicable to the determination of a mark are as shown in Table 1 presented below.

TABLE 1

| Check Mark | Setting | Canceling | Not Yet Set |
|---|---|---|---|
| Number of Closed Areas | 2 | 4 | 1 |

The setting method has eliminated all the troublesome restricting conditions, such as the direction for the entry of a mark and the angle for such an entry, so that the only condition is that the number of the closed areas formed by the check circle 103 and the check mark 105 should be two areas in the case of the "setting" operation but that the number of the closed areas formed by the entry of the check mark 105 and the canceling mark 106 in such a way as to cut across the check circle 103 should be four areas in the case of the "canceling" operation.

The job control sheet 10 with marks placed in the control job designating columns, as shown in FIG. 4, is to be placed over an original document bundle 11 on which it is desired to have control jobs executed, and these are to be put in the automatic document feeding device 2, which is, for example, an automatic dual side document feeding unit. This operating step attains the same effect as a reservation of control jobs to be executed on an image processing equipment, such as a copying machine. In addition, the set-up of the control jobs can be completed by simply placing the next job 13 on the current job in case it is desired to set up the next job while the current job 12 is being executed. This feature saves the operator from the trouble of waiting by the side of the copying machine or the like until the current job 12 is finished.

(3) Overall Operations of Mark Recognizing Device

Next, a description will be made of the operations of a mark recognizing device which recognizes the mark entered on the job control sheet 10. In this regard, FIG. 5 presents a flow chart illustrating the algorithm for recognition of the job control sheet 10, and FIG. 6 illustrates the details of a job recognizing block.

(a) Bar code detection

When the automatic document feeding device 2 feeds the job control sheet 10 as placed on the original document bundle 11 to the image reading block 3, this block 3 scans the original document in step S1 by means of an image reading device, such as an image scanner, and reads the image data on the job control sheet 10 into itself. The sheet distinguishing block 5 reads the bar codes in the original document distinguishing mark 100 placed on the job control sheet 10 in step S2 and performs an operation for determining whether the sheet thus read is a job control sheet 10 or an ordinary original document in step S3.

(b) Distinction between job control sheet and ordinary original document

The system control block 1 starts up the job recognizing block 7 when it determines in the bar code detecting step (step S2) that the read sheet is the job control sheet 10.

(c) Conversion into binary values and thinning-out operation

The system control block 1 starts up a binary value conversion/thinning-out block 21 in order to obtain the image information to be used for the recognition of the particulars of a job (in step S6) as described later. Then, the system control block 1 converts in step S4 the input image signal 20 representing a thick and thin image, thins out the image data by eliminating the unnecessary image data in the subsidiary scanning direction, and stores the processed data thereafter in a page memory 22 in step S5.

(d) Storage of check circle in window memory

A Central Processing Unit (CPU) 25 detects the original document distinguishing mark 100, ... placed on the job control sheet 10 and found by the bar code detecting step (i.e. step S2), performs a retrieving operation for the data, for the bar code identified in this manner, on the job/coordinate information table 9, using the attributes of the job control sheet 10, loads the coordinate information thus obtained into the CPU 25, determines an area which it is desired to be cut out and stored in a window memory 24, namely, an area for the check circles 103, ..., generates an address for the image thus cut out, and transmits this cut out address to a direct memory access controller 23. Then, this direct memory access controller 23 takes out the check circles 103, ..., which form a part of the image stored in the page memory 22, and loads them into the window memory 24.

(e) Recognition of job particulars

Now, the functions of the job recognizing block 7 will be described with reference to FIG. 6.

The recognition to be made of the particulars of a job in step S6, namely, the determination of the meaning contained in the mark placed by the operator in the check circle 103, will be made clear by the description in Section (5) "Details of operation for distinguishing check marks", which will be presented later. However, it is to be mentioned here that such a recognition of job particulars will be realized by applying a filtering process to a part of the image information cut out by the method described above, with a square matrix, which is 3×3 in the maximum, being applied as the filtering coefficient, performing the processing of the image into fine lines, a corrosive treatment of the line from an end point of the entered mark, a process for the extraction of the branching point, and counting the number of the crossing points obtained from the result of this extraction. For the purpose of this series of operations, the job recognizing block 7 is provided with line buffers 26, 26, and 26 formed therein for three lines. Then, the CPU 25 sets a filtering coefficient for use in the process for the recognition of the particulars of a job in a filter 27, retrieves the image information stored in the window memory 24 by putting the direct memory access controller 23 into action, and thereby performs the filtering process, which will be described later. Then, the CPU 25 counts the number of the crossing points obtained from the result of the filtering operation and determines the meaning contained in the mark entered in the mark column, based on the counts of the crossing points.

(f) Job set-up

In step S7, the CPU 25 sets a control job to be executed by a copying machine or the like, with reference to the determined result obtained on each check circle 103 in step S6 for the recognition of the particulars of the job and the information code stored on the particulars of the job on the job/coordinate information table 9, and informs the control job thus set up to the system control block 1. Upon reception of the information, the system control block 1 shifts to the recognized control job in step S8 and executes the job on the original document bundle 11 which follows the job control sheet 10. Then, the system control block 1 repeats this processing operation until it is determined in step S9 that the job has been carried through to the end of the original document.

The description given above explains the overall flow of the operations performed by the mark recognizing device in case a control job is set up by the use of the job control sheet 10.

(4) Details of Recognition of Particulars of a Job

Now, the job recognizing block 7 determines the meaning of the mark entered by the operator in the check circles 103, ..., performing arithmetic operations on the filtering operation, and a description will be made in the following part with respect to more details of the algorithm for the specific manner how the check mark 105 shown in FIGS. 3 (A) through 3 (C) is recognized, namely, the algorithm for the execution of step S6 (for the recognition of the particulars of a job) shown in FIG. 7 and described above. In this regard, the steps from S11 through S16 represent the detailed steps for step S6 for the recognition of the particulars of a job.

In step S11 shown in FIG. 7, the CPU 25 finds a coordinate correcting factor through arithmetic operations conducted by comparison of the coordinate origin point 101 and opposite angle point 104 marked on the job control sheet 10, the coordinate information of the check circle 103 stored in the job/coordinate information table 9, and the actual values of the coordinates stored for the origin point/the opposite angle points in the page memory. The CPU 25 then makes a correction of the coordinate information of the check circles stored in the job/coordinate information table 9.

Next, the CPU 25 retrieves the coordinates for each check circle 103 stored in the job/coordinate information table 9 and makes a correction of the coordinate values on the basis of the coordinate correcting factor obtained in step S11, and determines a check circle area 33 shown in FIG. 8 on the basis of the coordinate values thus corrected. FIG. 8 shows the relationship between the central coordinate 32 of the check circle and the determined check circle area 33, and the CPU 25 determines the check circle area 33 and its size in consideration of the diameter of the check circle 103 and the distance between the adjacent check circles. Then, the CPU 25 stores the image present within this area into the window memory 24 by means of the direct access controller 23.

In step S13, the system performs operations for distinguishing the marks for the purpose of determining the status of "set up," "canceled," and "not yet set up" on the basis of the definition described for such a determination in the description given above with reference to the FIGS. 3 (A) through 3 (C) in respect of the image stored in the window memory 24. For this distinction, the distinguishing conditions given in the description with regard to FIGS. 3 (A) through 3 (C) are employed. That is to say, it is determined which of the conditions shown in FIG. 1 agrees with the number of the closed areas, which are composed of the check circle 103, the check mark 105, and the canceling mark 106, and it is also determined whether a control job has been set up or has been canceled. Then, the results obtained from such determinations are stored in step S14 into a memory connected with the CPU 25 but not shown in the drawings. Then, the retrievals of the subsequent check circles in step S16, as well as the processing operations in steps S11 through S14, will be repeated until it is determined in step S15 that there is no longer any check circle to be subjected to the mark distinguishing operation.

Incidentally, the mark distinguishing operation (in step S13) is performed for the purpose of determining the number of the closed areas as shown in Table 1 given above. In this regard, it is noted that the presence of a closed area as demarcated within the check circle 103 with the check mark 105 and the canceling mark 106 means that there are inevitably crossing points between the check mark 105 placed by the operator and the check circle 103 and that there are crossing points formed of the check mark 105, the canceling mark 106, and the check circle 103 in the images other than those in the check circle 103 in which such a mark has not yet been set up. Therefore, the number of the crossing points will be different, depending on the distinction among the states, "set up", "canceled", and "not yet set up". Hence, the relationship between the check marks and the number of crossing points is as shown in Table 2 given below.

TABLE 2

| Check Mark | Setting | Canceling | Not Yet Set |
|---|---|---|---|
| Number of Crossing Points | 2 | 3 or more (5 in ideal case) | 1 or less (Zero in ideal case) |

With attention paid to this point, this embodiment of the present invention is constructed so as to perform the determination of the check marks (in step S13) by using a determining method based on the number of crossing points on the occasion of a determination of the number of closed areas. Moreover, the number of the crossing points will be three in the state of "canceling" shown in Table 2 in a case in which the check mark 105 is entered in such a way as to cross only once with the boundary line in the check circle 103 and also the canceling mark 106 is entered in such a way as to cross this check mark 105 and also to cross only once with the boundary line in the check circle 103, and the number of the crossing points will be five in total in the same state of "canceling" in a case in which the check mark 105 and the canceling mark 106 entered in such a manner as to cross each other are entered in such a way that they cross two times each with the boundary line in the check circle 103.

(5) Details of Operation for Distinguishing Check Marks

FIG. 9 illustrates a flow chart for an algorithm for performing the determination of the check marks (step S13) shown in FIG. 7 by the number of crossing points. Moreover, FIG. 10 (A) shows the image prior to the processing of the image for its conversion into fine lines, with the part of the crossing of the check mark and the check circle being shown on an enlarged scale, FIG. 10 ($A_M$) is a magnified portion of FIG. 10 (A), FIG. 10 (B) shows the image after its conversion into fine lines, and FIG. 10 (C) shows the image after it is treated for its corrosion starting with an end point thereof, these figures being given as model charts illustrating specific examples in the process in which the image undergoes changes by the effect of this algorithm. As regards the filtering process, moreover, FIG. 11 (A) shows a filtering coefficient for the execution of a processing operation for converting the image into fine lines while FIG. 11 (B) shows a filtering coefficient for the execution of a corrosive treatment starting with an end point of the line and FIG. 11 (C) shows a filtering coefficient for executing the extraction of a branching point.

Figure 10:
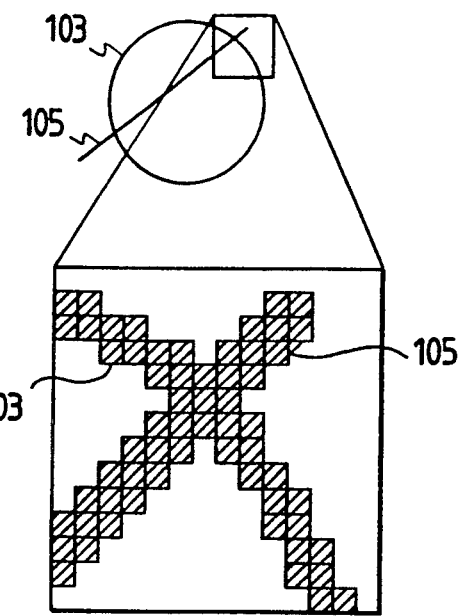
FIG. 10 (A) is a model chart illustrating an image prior to the execution of a transformation into fine lines and FIG. 10 ($A_M$) is a magnified portion of FIG. 10 (A)
Figure 10A:
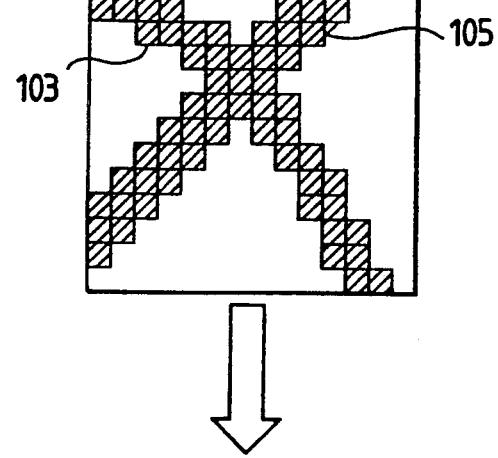
Figure 10B:
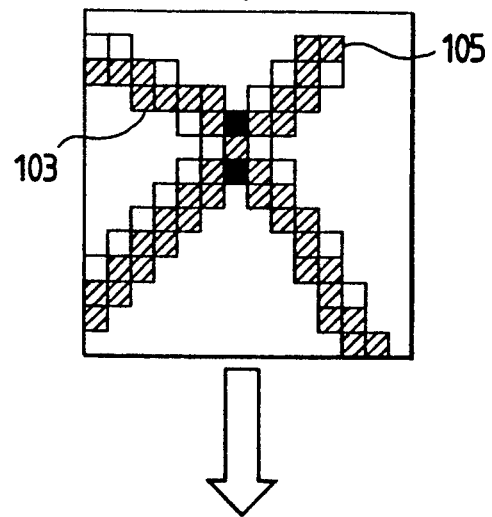
Figure 10C:
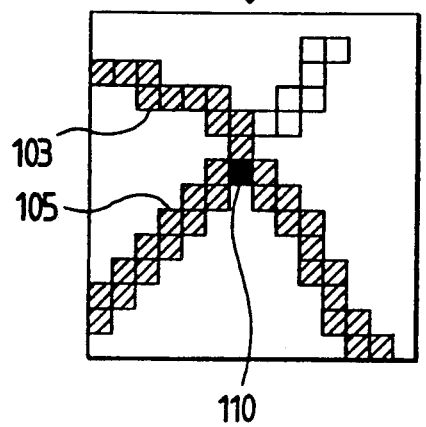
Figure 11A:
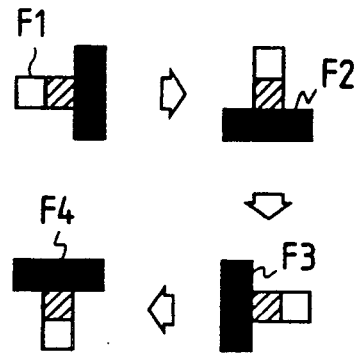
FIG. 11 (A) is a chart illustrating a coefficient used for a filter in the conversion into fine lines.
Figure 11B:
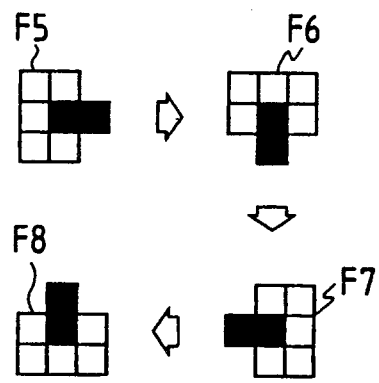
Figure 11C:
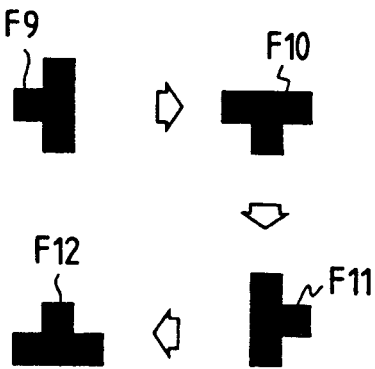

First, the processing operation for converting the image into fine lines will be performed after the image stored in the window memory 24 is fed into the line buffers 26, 26, and 26 in step S20, but this operation for a conversion of the image into fine lines can be realized with a filtering coefficient shown, for example, in FIG. 11 (A). The CPU 25 sets the filtering coefficient F1 shown in FIG. 11 (A) on the filter 27 and then performs a scanning operation on the image taken out from the line buffers 26, 26, and 26 while observing the pixels in the proximity of 3×3, using as reference the noted pixel for the filtering coefficient F1. On the occasion of this scanning operation, the CPU 25 employs the method for applying a pattern matching process in which the noted pixel is converted into a white pixel in case the CPU 25 judges that the pattern composed of black pixels and the white pixels within the pixels in the proximity of this factor 3×3 has come into agreement with the pattern determined by the filter coefficient F1. This pattern matching process is performed in the order of the filtering coefficients F1, F2, F3, and F4. Then, after the image is subjected to the process for its conversion into fine lines in step S21, the CPU 25 compares the images respectively preceding and following the process for conversion into fine lines and continues to perform this process until it is found in step S22 that there is no longer any change occurring in the image, thus executing a process for conversion of the image into fine lines having a concatenativity factor of one to four in width. The image shown in FIG. 10 (A) undergoes a change in this manner into the image shown in FIG. 10 (B) as processed for its conversion into fine lines by the process for conversion into fine lines (in steps S20 through S22). Moreover, the image after the conversion into fine lines, which is shown in FIG. 10 (B), has two branching points in it.

Next, also the processing for "a corrosion starting with the end point" of the line in the check mark 103 of the image shown in FIG. 10 (B) in its state after its conversion into fine lines is attained by a filtering process by the factor of 3×3 in the same way as in the conversion into fine lines. In specific terms, the CPU 25 sets the filtering coefficients F5, F6, F7, and F8 one by one in the stated order on the filter 27 as shown in FIG. 11 (B), and, while it compares the images observed before and after its processing for corrosion starting with the end part of the line in step S24, the CPU 25 executes the corrosive treatment for a conversion of the noted pixels into white pixels, carrying out the pattern matching operations, until it is determined in step S25 that there is no longer any change occurring in the pixel, and then the image thus processed is transformed into the image shown in FIG. 10 (C), with a "corrosion starting from the end point of a line and getting into the image".

Then, the CPU 25 sets the filtering coefficients marked F9 through F12, which are shown in FIG. 11 (C), one by one in the stated order on the filter 27 and executes the process for extracting a branching point while carrying out the pattern matching process in step S26, and the single branching point shown by the reference numeral 110 in FIG. 10 (C) is extracted.

Each of the processing operations mentioned above is performed on the entire circumference of the check circle 103. Now that the pixel 110 which has been extracted by the branching point extracting operation will be in agreement with the number of the crossing points, the number is counted up by one each time the extraction of a branching point is completed. The CPU 25 distinguishes the results of the counting operation on the basis of the determining conditions stored in advance on the job/coordinate information table 9 and shown in Table 2. If it is found in step S28 that the number of the branching points is two, the CPU 25 regards in step S30 that the state is "set up", and, if it is found in step S29 that the number of the branching points is in excess of two, then the CPU regards in step S31 that the state is "canceled", and, if it is found "NO", then the CPU 25 regards in step S32 that the state is "not yet set up". Then, the CPU 25 performs the process for conversion into fine lines, the corrosive treatment, and the branching point extracting process mentioned above on the other check circles 103 in the manner described above and performs the counting of the number of the crossing points. Furthermore, the corrosive treatment also attains a corrosion of such noises as those caused by the particulate stains which occur in the course of a printing operation with a printer or a copying machine in the course of the corroding operation starting with the end part of the line, and the process is therefore capable of preventing a decline which will otherwise occur in the accuracy of recognition because of the noises just mentioned.

The equipment operating with the algorithm described above in accordance with the mark placing and deleting method and the mark recognizing method according to the present invention recognizes a mark specified on the job control sheet 10, retrieves a control job corresponding to the marked check circle 103 from the job/coordinate information table 9, and recognizes and sets a control job.

Next, the overall effect of the mark recognizing device mentioned above will be described in the following part.

The system sets a control job by entering the check mark 105 which divides the closed area in the check circle 103 into two parts, as shown in FIG. 3 (A), in the check circle 103 for the job designating columns 102, ..., on the job control sheet 10 shown in FIG. 2, and, in case any mistaken entry has been made of a control job, the system enters the canceling mark 106, which crosses the previously entered check mark 105 and also cuts across the closed area in the closed area in the check circle 103, as shown in FIG. 3 (B). Then, as shown in FIG. 4, the job control sheet 10 will be transported to an image reading block 3 when the job control sheet 10 is placed on an original document bundle 11, these being then placed in the automatic document feeding device 2 shown in FIG. 1. Here, the original document is scanned (in step S1), and the image signal 20 read of the original document is transmitted to the sheet distinguishing block 5, which reads the original document distinguishing mark 100 indicated in a bar code on the job control sheet 10 (in step S2), and it is determined here in step S3 that the image signal thus transmitted is an image signal from the job control sheet 10. With this, the system control block 1 puts the selector 6 into operation and transmits the image signal to the job recognizing block 7. Here, the operation for converting the image signal into binary values and thinning-out operation are performed on the resulting data (in step S4), and the image data produced in this manner are stored in the page memory 22 (in step S5).

Then, the mark recognizing device finds a coordinate correcting factor (in step S11) by making comparison of the coordinate origin point 101 and the opposite angle point 104 on the job control sheet 10 with the coordinate information in the check circle 103 as stored on the job/coordinate information table 9. Then, the mark recognizing device performs an operation for retrieval of the coordinates for the check circle 103 as stored on the job/coordinate information table 9 and corrects the coordinate values on the basis of the coordinate correcting factor, and then determines the check circle area 33 for the check circle 103, as shown in FIG. 8. The CPU 25 controls the direct memory access controller 23 and stores the check circle 103 in the window memory 24 (in step S12).

Next, the CPU 25 puts the image signals collected for three lines from the check circle 103 and stored in the window memory 24 into the line buffers 26, 26, and 26, then sets the filtering coefficients F1, F2, F3, and F4, which are shown in FIG. 11 (A), in the filter 27 one by one in the stated order, and performs a processing operation for a conversion of the image shown in FIG. 10 (A) into fine lines (in step S20) while performing a pattern matching operation. Then, until the time when no change occurs in the images after the conversion into fine lines as compared with the images before such a conversion, the CPU 25 compares the images (in step S21) and continues performing the operation for converting the images into fine lines having concatenativity in the ratio of four to 1 in width. When no change occurs any longer in the images (in step S22), the CPU 25 sets the filtering coefficients F5, F6, F7, and F8 one by one in the stated order on the filter 27 in the same way and then makes a comparison of the images between their state before the performance of the corrosive treatment starting from the end point of the line and their state prior to such a treatment (in step S24), and continues to perform the corrosive treatment until no change occurs any longer in the images (the step S25).

Next, the CPU 25 sets the filtering coefficients F9, F10, F11, and F12 shown in FIG. 11 (C) one by one in the stated order on the occasion of an operation for extracting the branching points, performing the extraction of branching points while performing the pattern matching operation in the same manner (in step S26), and counts the number of the branching points (in step S27) at each time when the extraction of a branching point is finished. The operations described above are performed on the entire circumference of a check circle. Next, the CPU 25 sets a control job (in step S30) if it finds (in step S28) that the number of the branching points is two, but, if it finds in step S29 that the number of the branching points is in excess of two, the CPU 25 determines in step S31 that the control job has been canceled. The CPU determines in step S32 that no control job has been set yet if it finds that the number of the branching point is zero.

(6) Description of Other Embodiments

In the embodiment given above, the method of entering a check mark by the operator is set in such a manner that the system regards a mark entered so as to divide the check circle into halves as "a set-up of a control job" while it regards a mark entered so as to form an X-form in the check circle as "a cancellation of a control job set up previously", as illustrated in FIGS. 3 (A) thorough 3 (C). Also, the conditions for determining a marking method are such that the number of the crossing points which should be present between the check circle and the mark is "two" for the case of "the set-up" of a control job, but that the number of the crossing points which should be present is "three or more" for the case of "the cancellation" of a control job set up previously, and thus the check mark entering method according to the present invention does not impose any restriction concerning the direction or angle of entry to be observed at the time for marking. For this reason, it is not necessarily required of a check circle to be in a circular shape, and the recognition algorithm described in the embodiment given above can be applied to a case in which the check circle is formed in a rectangular shape instead of a circle. Furthermore, as a check circle may be in any graphic form so long as a closed area is secured in it, it will also be possible to prompt the operator to recall different information from each of various shapes of a check circle. For example, it is possible to develop a specification which works with check circles formed in icon-like patterns with a closed area formed therein and set in correspondence with the screen interface used on the ordinary CRT screen.

Also, it is possible to modify the definition for the determination of the check mark shown in FIG. 3 (A) through FIG. 3 (C) by some modification of the algorithm shown in FIG. 9 for the determination of the check marks.

Figure 12A:
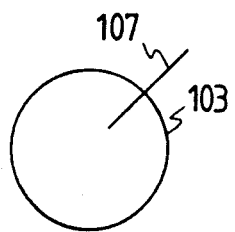
FIG. 12 (A) is a model chart showing a mark for setting a control job as entered thereon in its state of crossing only once with the boundary line in the check circle.
Figure 12B:
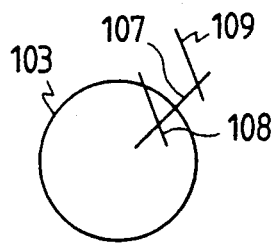
Figure 12C:
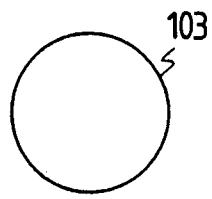

The mark entering method is defined, for example, in such a manner that a mark 107 for setting up a control job is entered to cross the check circle 103 only once as shown in FIG. 12 (A), that a canceling mark 108 for canceling a control job set up in the manner shown in FIG. 12 (B) is entered to cross the check circle 103 only once and to cross the mark 107 entered previously, and that a canceling mark 109 is entered to cross only with the mark 107. In this case, the number of times of the looping operations is stored for the steps of the processing operation for a conversion into fine lines in steps S20 through S22 in the algorithm shown in FIG. 9, and the number of times of the looping operations for steps S23 through S25 for the corrosive treatment performed from the end point of the line is set for execution in the stored number of times of the looping operations for the operation for a conversion into fine lines. This approach will ensure the execution of the corrosive treatment starting with the end point to the extent of the thickness of the lines for the check mark and the check circle, so that it is thereby made possible to prevent the corrosion of all of the check mark 107 or the canceling marks 108 and 109 for the set-up or cancellation of the control jobs shown in FIG. 12 (A) and FIG. 12 (B).

This mark entering method does not permit the elimination of any of the crossing points formed of the control job setting mark 107 and the canceling marks 108 and 109 even by the corrosion performed from the end point of the line. An extraction of branching points performed at this stage will make it possible to distinguish the "set-up" state, the "canceled" state, and the "not yet set up" state. In this case, the determining conditions are such that the number of the crossing points (branching points) is one for the "set-up" state, three or more for the "canceled" state, and zero for the "not yet set up" state.

Thus, it will be made possible to define a variety of methods for entering marks by slight modification of the check mark distinguishing algorithm in accordance with variations in the definition of the check marks.

Figure 13A:
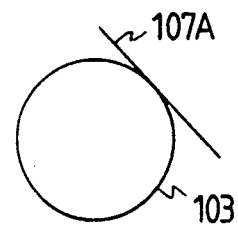
FIG. 13 (A) is a model chart showing the state in which a mark for setting up a control job for forming a point of contact with the boundary line in a check circle is entered in a mark column.
Figure 13B:
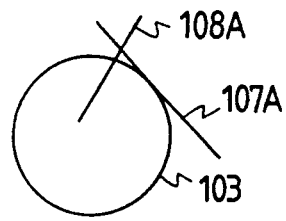
Figure 13C:
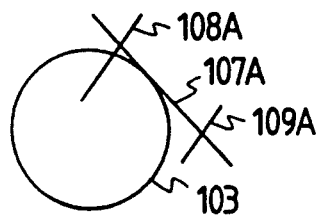

It should be noted in this regard that the method defined in accordance with the present invention is not limited only to the mark entering method in which a control job setting mark crosses the check circle 103, but it goes without saying that the mark entering method may be set up in such a manner that a control job setting mark is rendered in the form of a tangential line 107A which forms a point of contact with the check circle 103, as shown in FIG. 13 (A). Even in this case, it is of course possible to perform the counting process on the crossing points formed by such points of contact. For a cancellation of any control job already set up, a canceling mark 108A may be entered to cross the setting mark entering line 107A and the check circle 103 as shown in FIG. 13 (B), or a line 109A crossing the control job setting mark 107A may be entered, at the same time as this canceling mark 108A is entered, for their use as a canceling mark. Also in this case, it is possible to judge the cancellation of a control job on the basis of the result obtained by counting the number of the crossing points.

Also, the input images used in this embodiment are those images which are read by means of an image reading block, such as a commonly used image scanner, but the method according to the present invention is not limited to any such means of reading images, but may evidently be operated effectively with input images obtained by their input into a sheet distinguishing block after the images are transmitted, for example, by a facsimile system and decoded.

As described hereinabove, the present invention offers a mark placing and deleting method and a mark recognizing device, whereby a mark entering operation and a canceling mark entering operation can be executed in an extremely simple way, without any troublesome restricting conditions at all with regard to the direction or angle for the entry of lines since the methods operate with a line forming a crossing point or a point of contact with a boundary line in a mark column, which is entered as a mark for setting up a control job, and with a line forming a new crossing point with this line and the boundary line or with a line forming a new crossing point with this line or a line forming a new crossing point with this line and the boundary line, which is entered as a canceling mark, in case this entered mark is to be canceled. Moreover, the mark column itself can be sufficiently effective so long as the mark column forms a closed area and does not impose any other restriction at all, and it is therefore possible for the operator to obtain a variety of information by varying the shape of the mark column itself. On the contrary, information on the control jobs may be given to the shape itself of the mark column, so that the information may be communicated to the operator who will set the marks through his observation of the information thus indicated on the mark column, and this feature will improve the affinity of the mark placing and mark deleting methods to the operator to that extent.

Furthermore, the mark placing method according to the present invention operates with a two-dimensional image reading device which reads a mark sheet containing a line crossing a boundary line in this mark column or forms a point of contact with the boundary line entered in it or containing a line forming a new crossing line with this line and the boundary line or a line forming a new crossing point with this line and with the boundary line entered in it, and it is therefore possible to duplicate the job control sheet with an ordinary copying machine or the like. For this reason, the job control sheet can be printed and put out quite readily with an ordinary printer or the like without using any special ink or special toner for the printing of a job control sheet, unlike the case with the conventional mark sheet, and the present invention can, therefore, achieve a reduction of the cost needed for the printing of the job control sheet and can also serve as an user interface capable of handling this sheet in a convenient manner.

In addition, the present invention offers a mark placing and deleting apparatus in a construction provided with a crossing point counting means, which counts the number of the crossing points formed by an entry in the mark column on the mark sheet mentioned above, and a mark recognizing means, which recognizes the set-up and cancellation of a control job in accordance with the number of the crossing points thus counted, so that it is possible for the present invention to offer a mark recognizing apparatus capable of counting the number of the crossing points formed by the lines entered in the mark column mentioned above and determining the set-up of a control job and the cancellation of a control job on the basis of the number of the crossing points thus counted.

Furthermore, the present invention offers a mark placing and deleting apparatus in a construction which is provided further with a corrosive treatment means for performing a corrosive treatment starting with an end point of a line formed by the entry of a mark in the mark column, the corrosive treatment means working as a preliminary treatment means for the counting of the number of the crossing points mentioned above, so that the end point is corroded to attain a clean state and thus to eliminate, by the effect of corrosion, the noises generated by particulate stains formed at the time of printing with a printer or a copying machine or the like, thereby restraining a decline which the noises cause in the recognizing accuracy of the mark recognizing device.

What is claimed is:

1. A mark placing and canceling method, operating with a mark sheet provided with mark columns formed of closed areas demarcated with boundary lines, for entering a mark indicating a set-up of a control job in one of the mark columns, reading the mark sheet with a two-dimensional image reading device, and canceling the mark entered in the mark column on the mark sheet as recognized by means of a mark recognizing device, said method comprising the steps of:

(a) entering a line forming a crossing point with the boundary line, as a mark for setting up a control job; and (b) entering a line forming new crossing points with the already entered line and with the boundary line, as a mark for canceling the set-up of the control job, in case the already entered mark is to be canceled.

2. The mark placing and canceling method as defined in claim 1, wherein a first line forming a new crossing point with the already entered line and a second line forming new crossing points with the already entered line and the boundary line are entered, as the canceling mark, in case the already entered mark is to be canceled.

3. The mark placing and canceling method as defined in claim 1, wherein a line forming a point of contact with the boundary line is entered as the mark for setting up the control job.

4. The mark placing and canceling method as defined in claim 3, wherein a first line forming a new crossing point with the already entered line and a second line forming new crossing points with the already entered line and the boundary line are entered as the canceling mark, in case the already entered mark is to be canceled.

5. A mark recognizing device for recognizing a mark entered in a mark column on a mark sheet provided with mark columns formed of closed areas demarcated with boundary lines, by reading, with a two-dimensional image reading device, said mark sheet in which a line forming a crossing point with the boundary line is entered as a mark indicating a set-up of a control job in one of the mark columns, and a line forming new crossing points with the already entered line and with the boundary line are entered as a canceling mark in said mark column, said mark recognizing device comprising:

(a) crossing point counting means for counting the number of the crossing points contained in image data in said mark column on the basis of image data read by the two-dimensional image reading device; and (b) mark recognizing means for recognizing the set-up of the control job and the cancellation of the control job in said mark column in accordance with the number of the crossing points as counted by said crossing point counting means.

6. The mark recognizing device as defined in claim 5, wherein said device reads and recognizes the mark sheet in which a first line forming a new crossing point with the already entered line and a second line forming new crossing points with the already entered line and the boundary line are entered as the canceling mark.

7. The mark recognizing device as defined in claim 5, wherein said device reads and recognizes the mark sheet in which a line forming a point of contact with the boundary line is entered as the mark for setting up the control job.

8. The mark recognizing device as defined in claim 7, wherein said device reads and recognizes the mark sheet in which a first line forming a new crossing point with the already entered line and a second line forming new crossing points with the already entered line and the boundary line are entered as the canceling mark.

9. A mark recognizing device for recognizing a mark entered in a mark column on a mark sheet provided with mark columns formed of closed areas demarcated with boundary lines, by reading, with a two-dimensional image reading device, said mark sheet in which a line forming a crossing point with the boundary line is entered as a mark indicating a set-up of a control job in one of the mark columns, and a line forming new crossing points with the already entered line and with the boundary line are entered as a canceling mark in said mark column, said mark recognizing device comprising:

(a) corrosive treatment means performing a corrosive treatment starting with an end point of a line contained in image data in the mark column on the basis of image data read with the two-dimensional image reading device;

(b) crossing point counting means for counting the number of the crossing points contained in the image data in the mark column as processed for corrosive treatment thereof by said corrosive treatment means; and (c) mark recognizing means for recognizing the set-up of the control job and the cancellation of the control job in said mark column in accordance with the number of the crossing points as counted by said crossing point counting means.

10. The mark recognizing device as defined in claim 9, wherein said device reads, by means of the two-dimensional image reading device, and recognizes the mark sheet in which a first line forming a new crossing point with the already entered line and a second line forming new crossing points with the already entered line and the boundary line as the canceling mark.

11. The mark recognizing device as defined in claim 9, wherein said device reads and recognizes the mark sheet in which a line forming a point of contact with the boundary line is entered as the mark for setting the control job.

12. The mark recognizing device as defined in claim 11, wherein said device reads and recognizes the mark sheet in which a first line forming a new crossing point with the already entered line and a second line forming new crossing points with the already entered line and the boundary line as the canceling mark.

* * * * *